(12) United States Patent
Sakamoto

(10) Patent No.: US 7,701,535 B2
(45) Date of Patent: Apr. 20, 2010

(54) LCD DEVICE INCLUDING A REFLECTIVE FILM HAVING A CONVEX AND CONCAVE PATTERN

(75) Inventor: Michiaki Sakamoto, Kanagawa (JP)

(73) Assignee: NEC LCD Technologies, Ltd. (JP)

( * ) Notice: Subject to any disclaimer, the term of this patent is extended or adjusted under 35 U.S.C. 154(b) by 802 days.

(21) Appl. No.: 11/191,459

(22) Filed: Jul. 28, 2005

(65) Prior Publication Data

US 2006/0023144 A1    Feb. 2, 2006

(30) Foreign Application Priority Data

Jul. 29, 2004    (JP)    ............................. 2004-221398

(51) Int. Cl.
*G02F 1/1335*    (2006.01)
(52) U.S. Cl. ...................................... 349/113
(58) Field of Classification Search .................. 349/113
See application file for complete search history.

(56) References Cited

U.S. PATENT DOCUMENTS

2004/0070709  A1 *    4/2004    Kanou et al. ................ 349/113

FOREIGN PATENT DOCUMENTS

| JP | 6027481 | 2/1994 |
|---|---|---|
| JP | 6075238 | 3/1994 |
| JP | 10319422 | 12/1998 |
| JP | 2002-328209 | 11/2002 |
| JP | 2003-302633 | 10/2003 |

* cited by examiner

*Primary Examiner*—David Nelms
*Assistant Examiner*—Nathanael R Briggs
(74) *Attorney, Agent, or Firm*—Hayes Soloway P.C.

(57) ABSTRACT

A reflective LCD device includes a reflective film having a convex and concave pattern, wherein the convex and concave pattern includes a plurality of pattern groups having a common pattern and each including a plurality of (N) figure elements. Each figure element is obtained by randomizing a corresponding figure element in a standard pattern including a plurality of standard figure elements. In the randomization, the discrete angle of bright spots generated by diffraction of the reflected incident light assumes 0.01 degrees or smaller. The discrete angle α of the bright spots is defined by:

$$\alpha = (\lambda_A/Ls \times N) \cdot (180/\pi)$$

where $\lambda_A$ and Ls are average wavelength of the incident light and pitch of the standard pattern, respectively.

5 Claims, 8 Drawing Sheets

LCD DEVICE INCLUDING A REFLECTIVE FILM HAVING A CONVEX AND CONCAVE PATTERN

BACKGROUND OF THE INVENTION (a) Field of the Invention

The present invention relates to a liquid crystal display (LCD) device and, more particularly, to a reflective LCD device or transflective LCD device having a reflective film which reflects light incident from outside the LCD device toward an observer.

(b) Description of the Related Art

An LCD device includes an LCD panel, which acts as light switches for controlling the transmission of light, pixel by pixel, for display of images thereon. The LCD panel includes a liquid crystal (LC) layer, a pair of substrates sandwiching therebetween the LC layer, and a pair of polarizing films, each disposed in the vicinity of a corresponding substrates. The LC layer controls the polarization of light and the polarizing films control the transmission of light therethrough based on the polarized direction of the light.

The LCD devices are generally categorized in three types: transmissive type, reflective type and transflective type. The transmissive LCD device uses a light source disposed at the rear side of the LCD panel for displaying images. The reflective LCD device includes a reflective film disposed at the rear side of the LC layer for reflecting the light incident from the front side of the LC layer to pass again through the LC layer for displaying images. The transflective LCD device includes, in each of an array of pixels, a transmissive part having a function similar to the function of the transmissive LCD device and a reflective part having a function similar to the function of the reflective LCD device.

The reflective LCD device, as well as the transflective LCD device, has an advantage of lower power dissipation compared to the transmissive LCD device, and thus is generally used in a portable terminal such as cellular phone and personal digital assistant. The term "reflective LCD device" as used hereinafter, generally includes the transflective LCD device for the sake of convenience, if not recited otherwise.

A recent reflective LCD device includes, as a basic structure thereof, a twisted nematic (TN) LC layer, an array of switching elements for driving the LC layer pixel by pixel, and a reflective film disposed outside or inside the LCD panel. The reflective LCD device is generally driven in an active-matrix-drive scheme, wherein thin film transistors (TFTs) or metal-insulator-metal (MIM) diodes are used as the switching elements for achieving a higher resolution and a higher image quality. A bottom electrode, i.e., pixel electrode connected to the switching element in each pixel is generally used as a part of the reflective film.

Patent Publication JP-B-2825713 describes a reflective LCD device having a reflective film used as pixel electrodes. The surface of the reflective film has a convex and concave pattern corresponding to each pixel and including a plurality of dots or convex portions, which are disposed periodically and protrude from the concave portions. It is recited in the publication that each dot reflects the light incident from a variety of directions toward the direction normal to the LCD panel to thereby improve the brightness and thus the image quality of the LCD panel.

The reflective film is manufactured in the process as described below. A photosensitive organic film is formed on an underlying film, exposed to light through a mask pattern and etched for patterning by using a photolithographic and etching step. The resultant photosensitive organic film has discrete dots, i.e, dots isolated from one another. An interlayer dielectric film and a reflective film are formed on the discrete dots and the underlying film, whereby the surface of the reflective film has smooth, convex portions corresponding to the locations of the dots.

It is known that the light reflected by the reflective film as described above assumes a rainbow color due to the regular pattern of the reflective film which causes interference of light. The rainbow color causes a problem of degradation in the image quality of the LCD device.

Patent Publication JP-B-3012596 describes a solution for the problem of the rainbow color in the reflected light in the LCD device, wherein the dots on the surface of the reflective film are randomly disposed in each pixel to thereby suppress the interference of light. In this publication, the pattern of the dots is common to all the pixels for reducing the amount of work for forming the mask pattern.

Although the problem of the rainbow color is suppressed by the structure described in Patent Publication JP-B-3012596, the solution is not sufficient in view of the image quality required of the recent LCD device. For further suppressing the above problem, it may be considered to use a bead adhesive layer between the front substrate and the polarizing film, the bead adhesive layer being such that a large number of beads are dispersed in the adhesive having a refractive index different from the refractive index of the beads. However, the bead adhesive layer reflects the light as a noise light to thereby degrade the contrast ratio of the LCD device by raising the luminance in display of a black color image.

Patent Publication JP-B-3066192 proposes to suppress the rainbow color in the reflected light by forming dots having different heights for suppressing the rainbow color. However, this configuration is also insufficient for suppressing the rainbow color, especially in the transflective LCD device having a smaller area of the reflective film in each pixel because smaller area intensifies the periodicity of the dots to thereby intensify the rainbow color.

It may be considered to suppress the rainbow color by randomizing the locations of dots in an area including a plurality of pixel areas. However, randomizing of the locations of dots in such a larger area generally requires a larger amount of work and thus is unpractical. In addition, the relation is not known in the art between the degree of randomization of the dots and achievement in the practical degree of suppression of the rainbow color.

SUMMARY OF THE INVENTION

In view of the above problems in the conventional techniques, it is an object of the present invention to provide a reflective LCD device capable of suppressing a rainbow color caused by the convex and concave surface of the reflective film in the reflective LCD device.

The present invention provides a liquid crystal display (LCD) device including a liquid crystal (LC) layer and a reflective film for reflecting incident light transmitted through the LC layer to allow the incident light to again pass through the LC layer, the reflective film having thereon a convex and concave pattern, the convex and concave pattern including a plurality of pattern groups having a common pattern and arranged periodically, each of said pattern groups including a plurality of (N) figure elements, each of the figure elements having, apexes randomly shifted, within a maximum shift amount equal to or more than 0.4, from corresponding apexes of a standard figure element in a standard pattern including a plurality of standard figure elements, wherein:

the random shift of apexes in each figure element allows a discrete angle α of bright spots defined by:

$$\alpha = (\lambda_A/Ls \times N) \cdot (180/\pi)$$

to assume 0.01 degrees or smaller, the bright spots occurring due to diffraction of the incident light reflected by the reflective film, the $\lambda_A$ being an average wavelength of the incident light, the Ls being a pitch of the standard pattern.

The present invention also provides a method for designing a liquid crystal display (LCD) device having a liquid crystal (LC) layer and a reflective film for reflecting incident light transmitted through the LC layer to allow the incident light to again pass through the LC layer, the reflective film having thereon a convex and concave pattern, the convex and concave pattern including a plurality of pattern groups having a common pattern and arranged periodically, each of said pattern groups including a plurality of (N) figure elements, the method including:

randomly shifting, within a maximum shift amount equal to or more than 0.4, apexes of a standard figure element in a standard pattern including a plurality of standard figure elements so that the random shift of the apexes in the figure elements allows a discrete angle α of bright spots defined by:

$$\alpha = (\lambda_A/Ls \times N) \cdot (180/\pi)$$

to assume 0.01 degrees, the bright spots occurring due to diffraction of the incident light reflected by the reflective film, the $\lambda_A$ being an average wavelength of the incident light, the Ls being a pitch of the standard figure elements.

In accordance with the LCD device of the present invention and the LCD device manufactured by the method of the present invention, a discrete angle of 0.01 degrees or smaller for the bright spots can suppress the color dispersion of the reflected light to thereby suppress the rainbow color in the reflected light.

The above and other objects, features and advantages of the present invention will be more apparent from the following description, referring to the accompanying drawings.

PREFERRED EMBODIMENT OF THE INVENTION

Before describing an embodiment of the present invention, the principle of the present invention will be described for a better understanding of the present invention. In a reflective LCD device using external light, the rainbow color light is considered to result from the diffraction of the light reflected from a reflective film, wherein the convex portions are periodically repeated in a short spatial period to form an equal pattern or a similar pattern. The present inventor conducted experiments as detailed below for investigating the relationship between the periodicity of the convex portions and the rainbow color in the reflected light.

Figure 4:
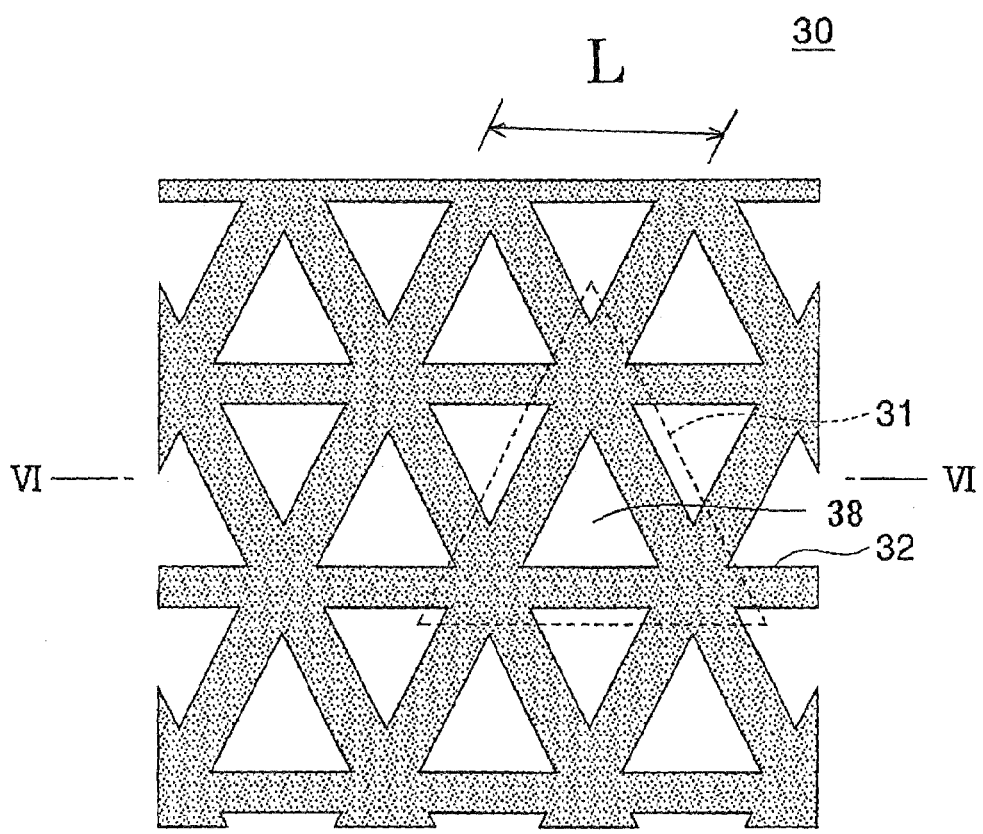
FIG. 4 is a top plan view of a sample of an equal pattern formed on a reflective film and to be used as a standard pattern.

The first experiment was conducted using a model of the reflective film having an equal pattern. FIG. 4 shows the equal pattern 30 of the model, including an array of figure elements 31 arranged without a gap therebetween and each having a convex portion 32 configuring peripheral sides of a triangle and a concave portion 38 configuring the internal of the triangle. The height of the triangle corresponds to the pitch (L) of the equal pattern, which was 20 micrometers.

Figure 5:
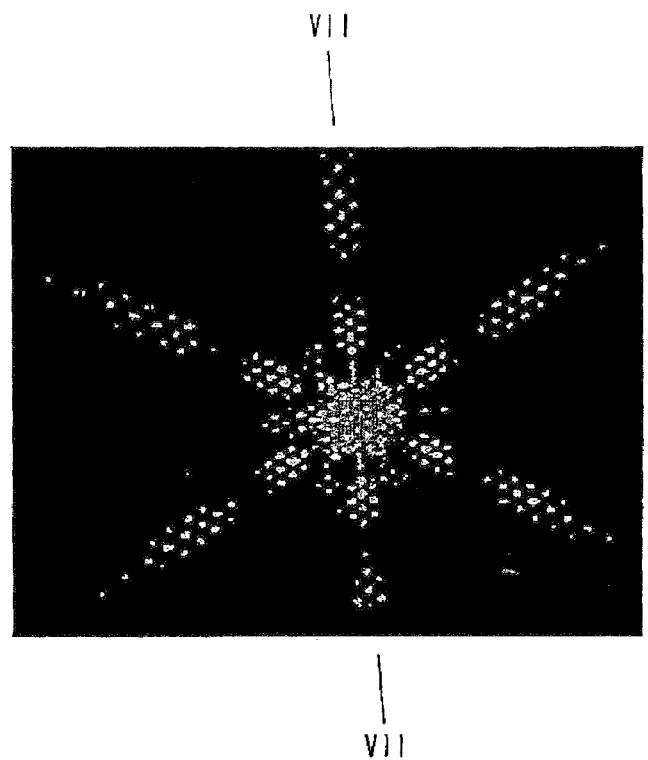
FIG. 5 is a camera image of a screen projected by reflected incident light reflected from the equal pattern of FIG. 4.

Red laser light having a wavelength of 670.5 m was incident onto the equal pattern 30 in the direction normal to the pattern surface for observing the red laser light reflected by the equal pattern. FIG. 5 shows the pattern of the reflected light projected on a screen which is disposed to oppose to the equal pattern 30 in a slanted direction. It will be understood that the pattern of the reflected light includes a central bright portion and a plurality of radial bright portions extending from the central bright portion at 60 degrees away from one another, and that each of these bright portions includes a plurality of bright spots discretely and regularly arranged. The fact that the discrete bright spots form such a pattern is considered to support the occurrence of the diffraction in the reflected light.

Figure 6:
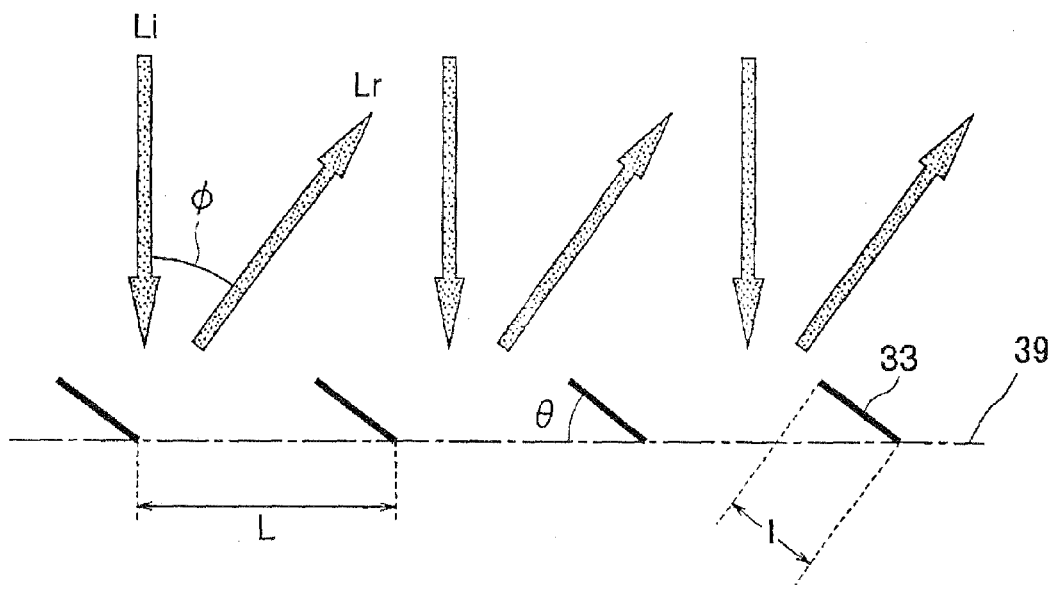
FIG. 6 is a sectional view of a simplified model for the pattern of the reflective film shown in FIG. 4.

The reason for the occurrence of the diffraction was assumed to result from the facts detailed with reference to FIG. 6. FIG. 6 is taken along line VI-VI in FIG. 4 to show a simplified model of the reflective film having the equal pattern of FIG. 4. In the simplified model shown in FIG. 6, the convex portion 32 in FIG. 4 has an effective reflecting surface 33 having a width "l" and slanted by an angle of θ degrees away from the plane 39 of the reflective film. The effective reflecting surfaces 33 are arranged at a pitch of "L". The pattern of the reflected light on the screen was assumed to be a product of the diffracted pattern resulting from the pitch "L" of the effective reflecting surface 33 and the diffracted pattern resulting from the width "l" of the effective reflecting surface 33.

In the model of FIG. 4, the angle $\phi_B$ of the reflected light Lr with respect to the incident light Li, which is referred to as "reflected angle" hereinafter, providing the bright spots in the diffraction pattern based on the pitch L of the effective reflecting surface 33 is derived from the condition under which the difference in the path length of the laser between each adjacent two of the reflecting surfaces 33 is an integral multiple of the wavelength λ of the incident light Li. The thus derived reflected angle $\phi_B$ is expressed by the following formula (1):

$$\phi_B = 2\theta + \arcsin(m\lambda/L) \approx 2\theta + m\lambda/L \tag{1}$$

where the m is an integer.

Figure 7A:
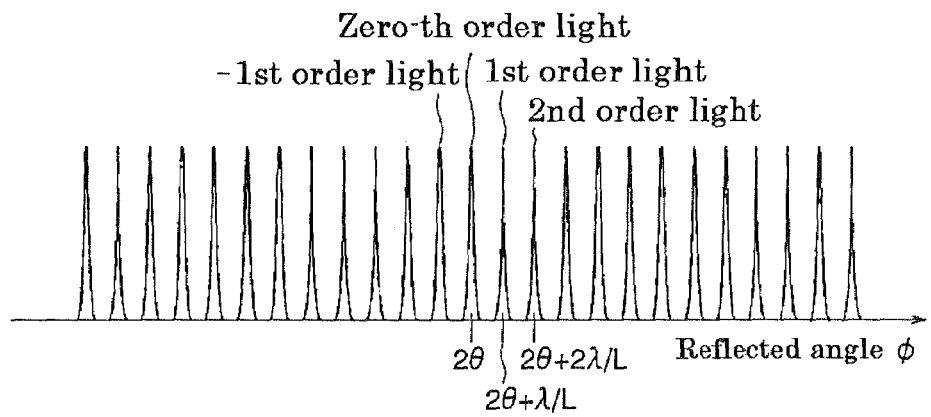
FIG. 7A is a diffraction pattern based on the pitch "L" of the pattern of the model of FIG. 6.

FIG. 7A shows the diffraction pattern of the reflected light based on the formula (1).

On the other hand, in the model of FIG. 4, the reflected angle $\phi_D$ providing the dark spots in the diffraction pattern based on the width "l" of the effective reflecting surface 33 is derived from the condition under which the difference in the path length of the laser between both the edges of the effective reflecting surface 33 is an odd-number multiple of half the wavelength λ of the incident light Li. The thus derived reflected angle $\phi_D$ is expressed by the following formula:

$$\phi_D = 2\theta + \arcsin(n\lambda/l) \approx 2\theta + n\lambda/l \quad (2),$$

where the n is an integer.

Figure 7B:
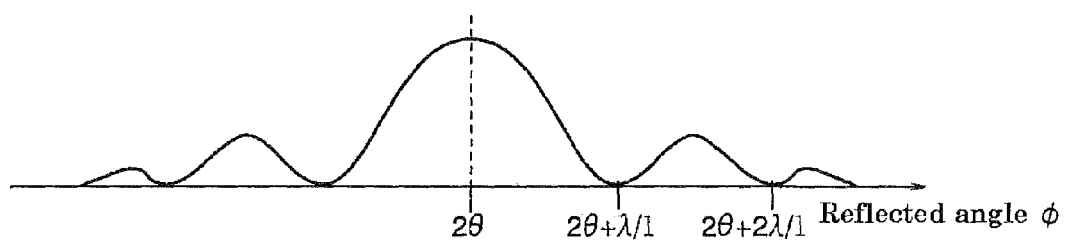
FIG. 7B is a diffraction pattern based on a width "l" of the effective reflecting surface of the model of FIG. 6.
Figure 7C:
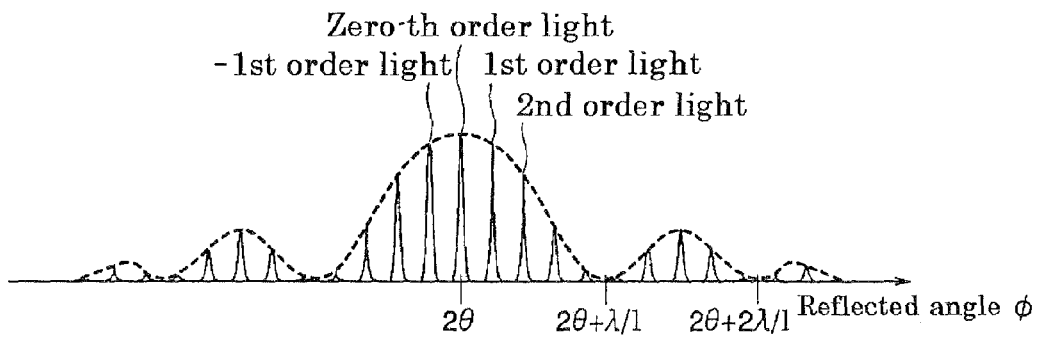
FIG. 7C is a diffraction pattern obtained by a product of the diffraction pattern of FIG. 7A by the diffraction pattern of FIG. 7B.

The diffracted pattern corresponding to the formula (2) is shown in FIG. 7B, and FIG. 7C shows the product of the diffracted pattern of FIG. 7A and the diffracted pattern of FIG. 7B. The dotted line in FIG. 7C corresponds to the diffracted pattern of FIG. 7B occurring based on the width "l" of the effective reflecting surface 33.

FIG. 5 is used herein to explain the reason of the reflected angles. It should be noted that the distribution of the radial bright portions extending in the direction of 60 degrees away from one another reflects the periodical arrangement of the regular-triangle figure elements 31 in the equal pattern 30 of FIG. 4. Based on this fact, it is noticed that the central bright portion corresponds to a reflected angle of 2θ, and that the pattern including the radial bright portions and associated dark portions in each radial bright portion roughly coincides with the spectrum diagram of the diffracted pattern shown in FIG. 7C. The spectrum diagram of FIG. 7C includes zero-th order diffracted light, plus and minus first-order diffracted lights, plus and minus second-order diffracted lights etc. Thus, the pattern of the reflected light shown in FIG. 5 can be clarified.

Figure 8:
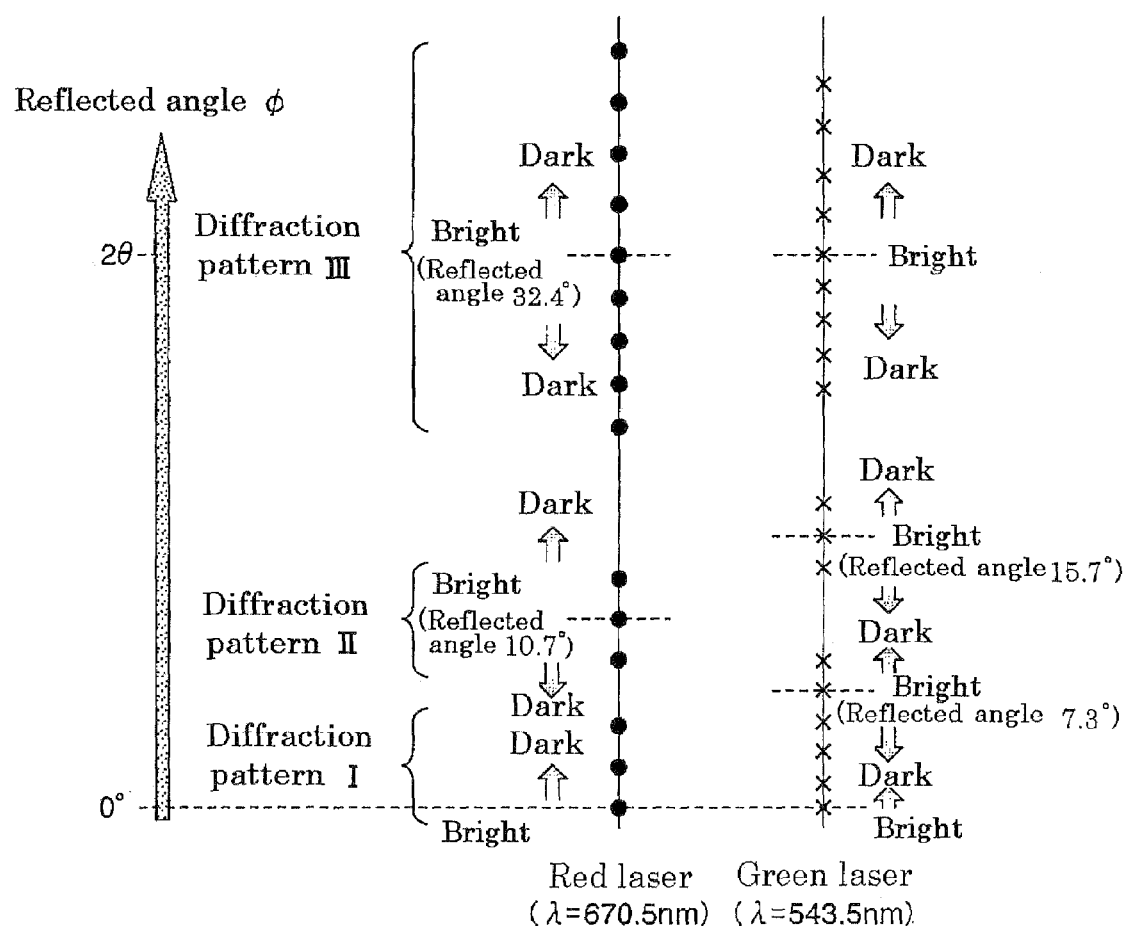
FIG. 8 is a schematic diagram of diffraction patterns of green and red laser lights, showing the results of analysis based on the diffraction pattern of FIG. 7C.

It is assumed that green laser light having a wavelength of 543.5 nm is incident onto the equal pattern 30 of the reflective film together with the red laser light. FIG. 8 shows the reflected angles of the bright spots in the diffracted pattern for the red and green laser lights, which are obtained by analysis of the spectrum diagram of FIG. 7C. The average slanted angle θ of the effective reflecting surface 33 is assumed here at 16.2 degrees.

As understood from the formulas (1) and (2), the reflected angles $\phi_B$ and $\phi_D$ depend on the wavelengths λ of the laser lights, and the reflected angle of the bright spots of the red laser light is slightly different from the reflected angle of the bright spots of the green laser light. It is possible to suppose therefrom that the chromatic dispersion occurs in the reflected light if a light having a variety of wavelengths is incident onto the equal pattern 30 of the reflective film. Thus, it was concluded that the rainbow color generated in the light reflected from the convex and concave pattern is caused by the fact that the reflected light includes bright spots apart from one another by discrete angles, and that the reflected angle slightly differs between the read, green and blue lights to generate the chromatic dispersion.

The chromatic dispersion in the reflected light as described above generates two different types of bright spots including a type of bright spots based on the pitch "L" and the other type of the bright spots based on the width "l" of the effective reflecting surface 33. Between them, the pitch "L" of the effective reflecting surface 33 more affects the chromatic dispersion caused by the bright spots.

Here, it is assumed that α is the angle between two adjacent bright spots caused by the pitch L of the equal pattern and referred to herein as the discrete angle of the bright spots. The discrete angle α of the bright spots in the reflected light from the equal pattern is expressed by the following formula:

$$\alpha = (\lambda/L) \cdot (180/\pi) \quad (3),$$

which is obtained by substituting m=1 in the formula (1).

If a green laser light is incident onto the equal pattern, the discrete angle α is calculated at 1.6 degrees by substituting 545 nm and 20 micrometers for λ and L in the formula (3).

Figure 9:
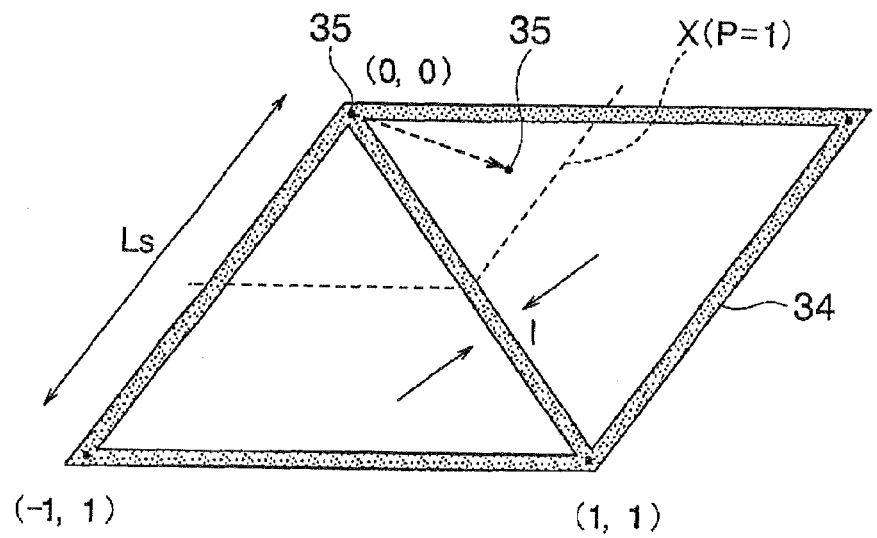
FIG. 9 shows randomization of figure elements by shifting an apex from the apex of the standard figure element in the present embodiment.

A reflective film is now considered having a pattern including a plurality of groups, which have a common pattern that are arranged periodically and each includes a fixed number (N) of figure elements such as 31 in FIG. 4, and in which the shapes of the figure elements are randomized from the standard figure element in each group. FIG. 9 shows the way of randomization of a figure element by shifting an apex from the apex of a standard figure element 34 of the standard pattern including a large number of standard figure elements 34. Each standard figure element 34 has a shape similar to the right triangle of the figure element shown in FIG. 4. The standard figure elements 34 are arranged at a standard pitch Ls of 20 micrometers and have a width "l" of 3 micrometers for the effective reflecting surface 33.

The apexes 35 of the right triangle are affixed with the coordinates thereof. The randomization of the standard figure element 34 can be achieved by randomly shifting the apexes 35 of each figure element 34. The shapes of the randomized figure elements may be herein expressed by the following formula: l r Ls rnd P (4), where "l" is the width of the effective reflecting surface of the convex portion, r is a coupling symbol, Ls is the pitch (standard pitch) of the standard pattern, rnd P is a random number having a digit smaller than P and defining a shift amount of the apex. The P is referred to as a maximum shift amount for the apex, within which the apex of the right triangle is randomly shifted from the apex of the standard figure element. The random numbers can be generated by a random number generator.

In the formula (4), the maximum shift amount P of the apex is an index within which the apex of the subject figure element is shifted from the apex of the standard figure element. If the shift amount rnd P assumes "0", the apex is not to be shifted, and if the shift amount rnd P assumes "1", the apex of the subject figure element is to be shifted to reach the central point between the original point of the apex and each adjacent apex of the standard figure element. The dotted line denoted by "X(P=1)" in FIG. 9 depicts the maximum shift amount for the subject apex 35 at the original location of (0,0) which is to be shifted along a dotted arrow. It should be noted that a larger value for the maximum shift amount P in the randomization corresponds to figure elements deformed in larger amounts.

The random shift of the apex in the figure element provides a different value for the pitch from the standard pitch. Assuming that the pitch L has a variation ΔL from the standard pitch Ls and ΔLmax is the maximum value for the variation ΔL, ΔLmax/Ls coincides with the maximum shift amount P for the apex. Here, the variation of the pitch L provides a variation of reflected angle $\phi_B$ of the bright spots. If the reflected angles $\phi_B$ of the bright spots are varied in ideally random amounts, the discrete angle α of the bright spots is equally divided by N, and expressed by the following formula:

$$\alpha = (\lambda/(Ls \cdot N)) \cdot (180/\pi) \quad (5).$$

The rough range of variation of the wavelengths of the visible light is calculated from the following formula:

$$\Delta(\lambda(\text{red light}) - \lambda(\text{blue light}))/\lambda(\text{green light}).$$

Substituting 670 nm, 450 nm and 545 nm for the wavelengths .lamda.(red light), .lamda.(blue light) and .lamda.(green light), respectively, in the formula (5) provides a value of 0.4 as the rough range of variation of the wavelength of the incident light. By setting the maximum shift amount P for the apex equal to or above 0.4 while using the calculated variation 0.4 as a target value, the locations of the bright spots can be varied substantially equally. In a practical LCD device, each pixel having a rectangular shape of a 100.times.300 micrometers size includes therein about 60 figure elements. By average randomization of the shapes of the figure elements provides a discrete angle .alpha. of about 0.03 degrees for the bright spots as understood from the calculation of 1.6.degree./60.

Figure 10:
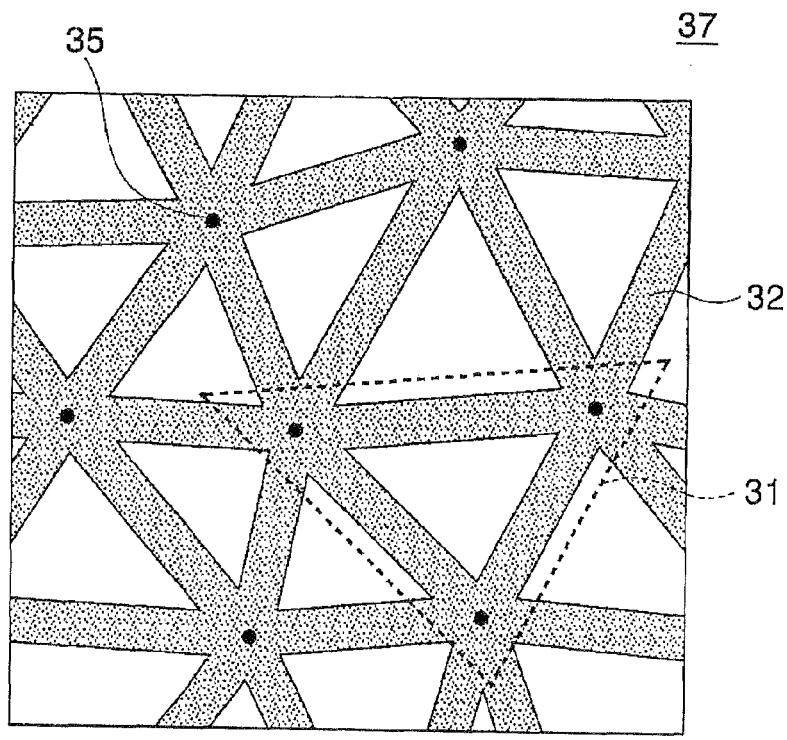
FIG. 10 is a top plan view of a sample of the convex and concave pattern formed on the reflective film in the LCD device of the embodiment.

Based on the above analyses, a reflective film was manufactured as a comparative sample including a plurality of groups of figure elements arranged periodically and each including 60 randomized figure elements. These figure elements were subjected to average randomization of shapes thereof from the standard figure element. FIG. 10 schematically shows the pattern of the reflective film of the comparative example manufactured. The reflective film 37 had the shapes of figure elements expressed by the formula (4) wherein "l", Ls and P are 3 (micrometers), 20 (micrometers) and 0.4, respectively, i.e., 3 r 20 rnd 0.4.

The reflective film 37 shown in FIG. 10 was irradiated by solar light, and the reflected light was observed with naked eyes, revealing presence of rainbow color in the reflected light. The presence of rainbow color was considered to be due to the fact that the bright spots were still observed as discrete spots by human eyes, although the 60 figure elements in each group were randomized from the standard figure element. More specifically, in order to suppress the rainbow color in the reflected light, it is not sufficient to obtain a discrete angle of 0.03 degrees, which necessitated a smaller discrete angle .alpha. of bright spots by employing a larger number (N) of figure elements in each group.

Based on the above experiment and additional analysis, a plurality of reflective films were manufactured as samples having different numbers (N) of figure elements in each group of the figure elements, the different numbers for N including 50, 100, 1000 and 10,000. The thus manufactured samples were irradiated by solar light, and the reflected light was observed with naked eyes with respect to the presence or absence of the rainbow color in the reflected light. The results of the experiments and the discrete angle of the bright spots for the samples are tabulated in the following table-1.

TABLE 1

| Number of figure elements in each group | Rainbow color | Discrete angle α of bright spots (degrees) |
| --- | --- | --- |
| 50 | Observed | 0.031 |
| 100 | Observed | 0.016 |
| 1000 | Observed in a small degree | 0.0016 |
| 10000 | Not observed | 0.00016 |

As will be partly understood from table-1, it was confirmed in experiments that a discreet angle α of 0.01 degrees or smaller for the bright spots suppressed the rainbow color down to a certain degree, and a discreet angle of 0.001 degrees or smaller more effectively suppressed the rainbow color.

The configuration used in the above samples can be applied to another structure wherein the concave portion configures the peripheral sides of the figure elements, in addition to the structure of the above embodiment wherein the convex portion configures the peripheral sides of the figure elements. The configuration can be also applied to another structure wherein the figure elements are disposed apart from one another, wherein the figure elements have another shape such as polygons or circles other than the triangle. In the structure wherein the figure element has a different shape, a distance between centers of adjacent standard figure elements may be employed as the standard pitch Ls, and this distance is substituted for the standard pitch Ls in the formula (5).

Thus, the present invention employs a reflective film in an LCD device, which includes a convex and concave pattern on the surface of the reflective film. The reflective film has an overall pattern including a plurality of groups having a common pattern, arranged periodically and each including a fixed number (N) of randomized figure elements arranged in a pitch L. The pitch N and the pitch L in the randomization are determined so that the discrete angle of the bright spots assume 0.01 degrees or smaller, and more preferably 0.001 degrees or smaller. The wavelength λ for calculating the discrete angle of the bright spots may be an average or regular wavelength $\lambda_A$ of the general incident light. In addition, for achieving a suitable variation of the discrete angle of the bright spots, the maximum shift amount for the apex should be set at 0.4 or above.

Now, the present invention is more specifically described with reference to accompanying drawings.

Figure 1:
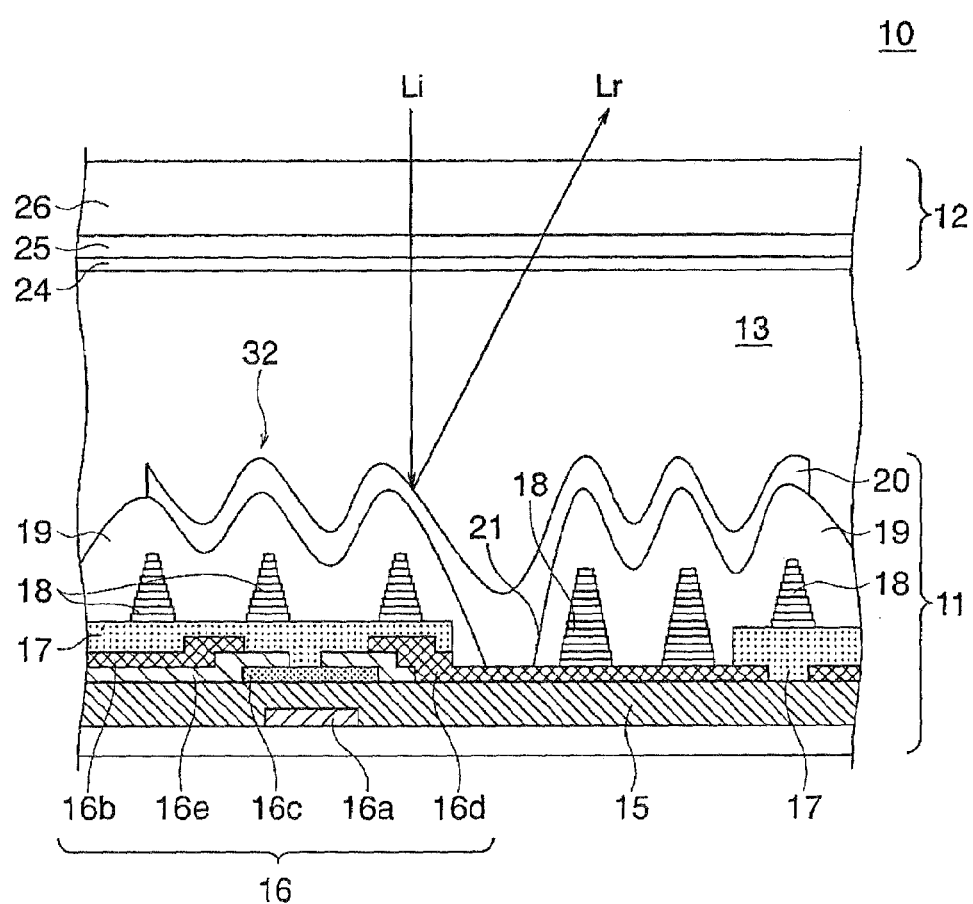
FIG. 1 is a sectional view of an LCD device according to an embodiment of the present invention.

FIG. 1 shows a pixel of a reflective LCD device according to an embodiment of the present invention. The LCD device 10 is of an active-matrix-drive type including a switching element in each pixel. The LCD device 10 includes a TFT substrate 11, a counter substrate 12, and a TN-mode LC layer 13 sandwiched between the TFT substrate 11 and the counter substrate 12. The LCD device 10 also includes a pair of polarizing films (not shown) sandwiching therebetween these substrates 11 and 12 and LC layer 13.

The TFT substrate 11 includes a glass substrate body 14, and a plurality of pixels formed thereon and each including a TFT 16. The TFT 16 includes a gate electrode 16a formed on the glass substrate body 14, a gate insulating film 15 formed on the gate electrode 16a, a semiconductor active layer 16c made from amorphous silicon, a pair of ohmic contact layers 16e formed on both end portions of the semiconductor active layer 16c, source/drain electrodes 16b and 16e disposed in contact with the respective ohmic contact layers 16e.

A first dielectric layer 17 overlies the TFT 16 including the source/drain electrodes 16b and 16d, semiconductor active layer 16c and ohmic contact layer 16c. An organic insulator layer configured to a plurality of island protrusions 18 is disposed on the first dielectric film 17. The island protrusion 18 has a height of about 2 to 4 micrometers. A second dielectric film 19 is formed on the entire surface including the surfaces of the island protrusions 18, first dielectric film 17 and source/drain electrode 16d. The second dielectric film 19 has therein a through-hole 21 via which an aluminum (Al) reflective film 20 formed on the second dielectric film 19 contacts with the drain electrode 16d. The reflective film 20 has a convex and concave surface that follows the contour of the underlying island protrusions 18 and the second dielectric film 17. The reflective film 20 acts as a pixel electrode.

Figure 2:
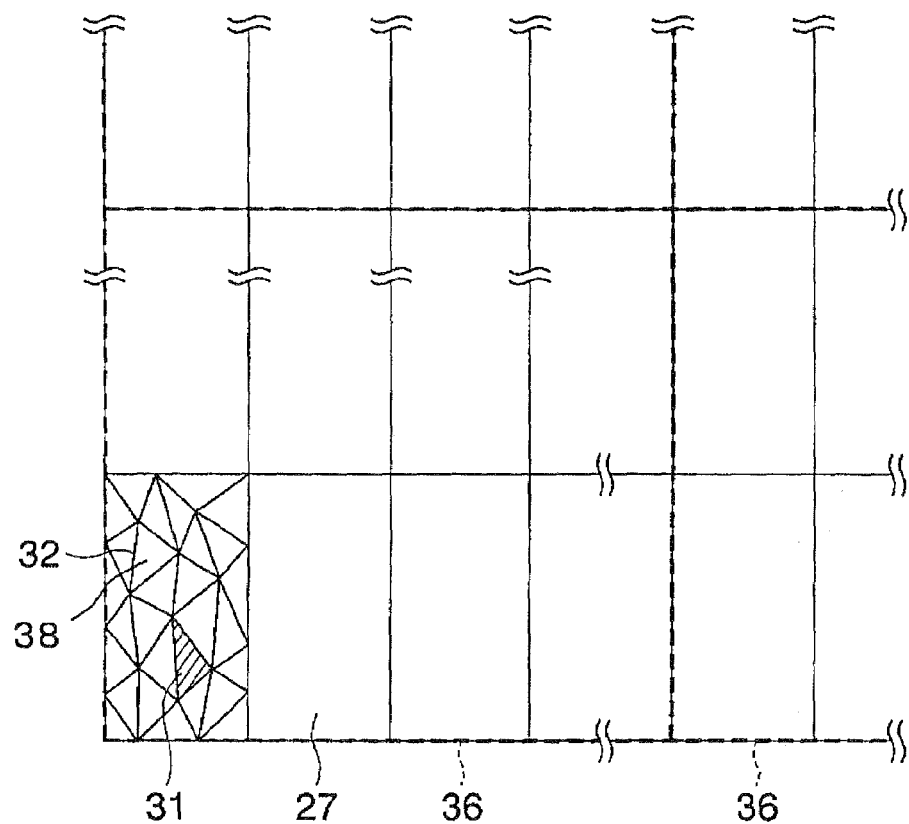
FIG. 2 is a schematic top plan view of pattern of the reflective film shown in FIG. 1.

FIG. 2 shows a schematic top plan view of the reflective film 20. The reflective film 20 has a plurality of figure groups 36 each group including a plurality of (10×20=200) segments 27. Each segment 27 of the reflective film 20 configures a pixel electrode and includes therein 50 figure elements 31. Thus, each group includes 10,000 figure elements 31, which are randomized from the standard figure element 30. All the figure groups have the same randomized pattern. In other words, the reflective film in the LCD device has a fixed pattern for all the figure groups.

Each figure element 31 is of a triangle having three sides formed as a convex portion encircling an internal concave portion. Each figure element 31 is formed by randomizing the standard pattern, such as shown in FIG. 4, including a plurality of regular triangles 31. The standard figure element includes a peripheral convex portion configuring an effective reflecting surface having a width "l" of 3 micrometers, and a convex portion encircled by the convex portion 32. The pitch Ls of the standard pattern is 26 micrometers. The maximum shift amount P for the apex in the randomization of the regular triangle is set at 0.5 in this example.

The configuration of the figure element 31 is expressed by the following formula;

3 r 26 rnd 0.5.

The discrete angle α of the bright spots is calculated by substituting Ls=26, N=10,000 and λ(green)=545 nm for Ls, N and λ in the formula (5), to obtain the value α=0.00012 degrees.

Back to FIG. 1, the counter substrate 12 includes a glass substrate body 26, color filters 25 formed on the glass substrate body 26, and a transparent counter electrode 24. The incident light Li incident onto the counter substrate 12 passes through the counter substrate 12 and LC layer 13 to reach the surface of the reflective film 20. The reflected light Lr reflected by the surface of the reflective film 20 passes through the LC layer 13 and counter substrate 12 to be emitted outside the LCD device 10.

In accordance with the LCD device of the present embodiment, by setting the maximum shift amount P for the apex at 0.4 or above, and the discrete angle α of the bright spots at 0.001 degrees or lower, a rainbow color is not observed in the reflected light Lr to achieve a superior image quality. The LCD device of the present embodiment suppresses degradation of the contrast ratio because an ordinary adhesive layer is used without using a bead adhesive layer. In addition, the suppression of the rainbow color is achieved irrespective of the size of the reflective film in each pixel.

A method for manufacturing the LCD device of the present embodiment will be described hereinafter with reference to FIG. 1. A protective insulator layer 15, TFTs 16 and a first dielectric film 17 are formed on a glass substrate body 14 by using known techniques. Subsequently, a photoresist acrylic film is formed as an organic insulator film thereon to a thickness of 2 to 4 micrometers, followed by a photolithographic step using a photomask to selectively expose the organic insulator film 18 for patterning.

The pattern of the photomask is a convex and concave pattern shown in FIG. 2, and has a light transmission area corresponding to the convex portion 32 of the triangle pattern 31 and a light shield area corresponding to the concave portion 38. The light transmission area has a width of 3 micrometers corresponding to the effective reflecting surface. The exposure of the organic insulator film allows the pattern of the photomask to be transferred onto the organic insulator film. A heat treatment is performed subsequent to the photolithographic step to selectively etch the cured portion of the organic insulator film to obtain a plurality of island protrusions 18 made from organic insulator.

Subsequently, a dielectric film is formed on the entire surface, and patterned by a photolithographic process using a resist pattern to obtain a second dielectric film 19 having therein through-holes 21. An aluminum (Al) film is then deposited by sputtering Al onto the second dielectric film 19, and patterned to form a plurality of sections of reflective film 20 each acting as a pixel electrode in a pixel. The reflective film 20 has a convex and concave surface following the contour of the underlying island protrusions 18.

Figure 3:
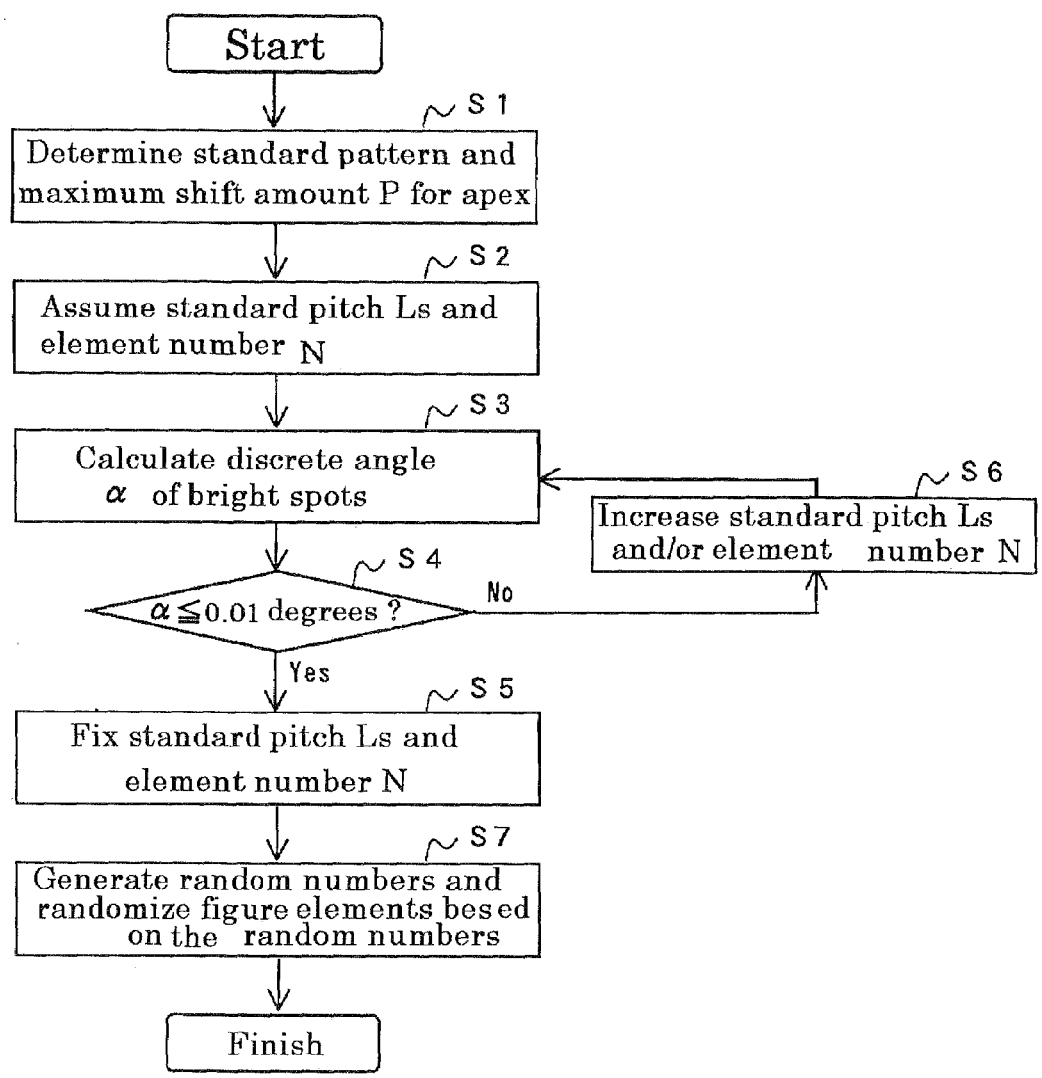
FIG. 3 is a flowchart of a process for designing the pattern of the reflective film shown in FIG. 2.

The process for designing the pattern of the reflective film will be described hereinafter with reference to FIG. 3. The process includes the step of determining the standard figure pattern, and then the maximum shift amount P for the apex of the standard figure element at 0.4 or above (step S1). Subsequently, the standard pitch Ls and the element number "N" defining the number of the figure elements in each group of the figure elements are assumed (step S2). Thereafter, the discrete angle α of the bright spots is calculated based on the formula (5) using the assumed values (step S3). It is judged whether or not the calculated value for the discrete angle α is equal to or below 0.01 degrees (step S4). If it is judged in step S4 that the calculated value for the discrete angle α is equal to or below 0.01, then the process advances to step S5, wherein the assumed standard pitch Ls and element number N are fixed. Thus, the standard pattern including the standard figure elements is obtained. Thereafter, random numbers are generated using a random number generator for randomly shifting the apexes of the standard figure elements to obtain the figure pattern of the group (step S6), to end the process for design of the pattern. The resultant pattern of the group is arranged periodically to form a mask for the concave and convex pattern of the reflective film.

If it is judged in step S4 that the discrete angle α is above 0.01 degrees, the process advances to step S6 to increase the assumed standard pitch Ls and/or element number N, and then returns to steps S3 and S4 wherein the discrete angle of the bright spots is calculated and examined.

It is to be noted that although the apex of the standard figure element is shifted in the randomization of the pattern, the width of the reflecting surface may be changed for each row or each column of the figure elements for the randomization.

Since the above embodiment is described only for an example, the present invention is not limited to the above embodiment and various modifications or alterations can be easily made therefrom by those skilled in the art without departing from the scope of the present invention.

What is claimed is:

1. A liquid crystal display (LCD) device comprising a liquid crystal (LC) layer and a reflective film for reflecting incident light transmitted through said LC layer to allow said incident light to again pass through said LC layer, said reflective film having thereon a convex and concave pattern, said convex and concave pattern including a plurality of pattern groups having a common pattern and arranged periodically, each of said pattern groups including a plurality of (N) figure elements, each of said figure elements having an apex randomly shifted, within a maximum shift amount (P) equal to or more than 0.4, from corresponding apexes of a standard figure element in a standard pattern including a plurality of standard figure elements, wherein:

the maximum shift amount (P) of the apex is an index within which the apex of the subject figure element is shifted from the apex of the standard figure element;

if a shift amount (rnd P) assumes "0", then the apex is not to be shifted, and if said shift amount (rnd P) assumes "1", then the apex of the subject figure is to be shifted to reach the central point between the original point of the apex and each adjacent apex of the standard figure element; and said random shift of said apex in each figure element allows a discrete angle α of bright spots defined by:

$$\alpha = (\lambda_A/Ls \times N) \cdot (180/\pi)$$

to assume 0.01 degrees or smaller, said bright spots occurring due to diffraction of said incident light reflected by said reflective film, said $\lambda_A$ being an average wavelength of said incident light said Ls being a pitch of said standard pattern.

2. The LCD device according to claim 1, wherein said discrete angle of said bright spots is equal to or below 0.001 degrees.

3. The LCD device according to claim 1, wherein a portion of said reflective film corresponding to said pattern group is configured by a plurality of pixel electrodes for controlling polarization of said LC layer in association with a counter electrode.

4. A method for designing a liquid crystal display (LCD) device having a liquid crystal (LC) layer and a reflective film for reflecting incident light transmitted through said LC layer to allow said incident light to again pass through said LC layer, said reflective film having thereon a convex and concave pattern, said convex and concave pattern including a plurality of pattern groups having a common pattern and arranged periodically, each of said pattern groups including a plurality of (N) figure elements, said method comprising:

randomly shifting, within a maximum shift amount (P) equal to or more than 0.4 an apex of a standard figure element in a standard pattern including a plurality of standard figure elements so that said random shift of said apex in said figure elements allows a discrete angle α of bright spots defined by:

$$\alpha = (\lambda_A/Ls \times N) \cdot (180/\pi)$$

to assume 0.01 degrees, said bright spots occurring due to diffraction of said incident light reflected by said reflective film, said $\lambda_A$ being an average wavelength of said incident light, said Ls being a pitch of said standard pattern wherein:

the maximum shift amount (P) of the apex is an index within which the apex of the subject figure element is shifted from the apex of the standard figure element; and if a shift amount (rnd P) assumes "0", then the apex is not to be shifted, and if said shift amount (rnd P) assumes "1", then the apex of the subject figure is to be shifted to reach the central point between the original point of the apex and each adjacent apex of the standard figure element.

5. The method according to claim 4, wherein said N and said Ls are determined so that said discrete angle of said bright spots assumes 0.001 degrees or smaller.

* * * * *